July 29, 1930.   G. ALLMAN ET AL   1,771,947
AUTOMATIC ANIMAL DRINKING FOUNTAIN
Filed May 16, 1928
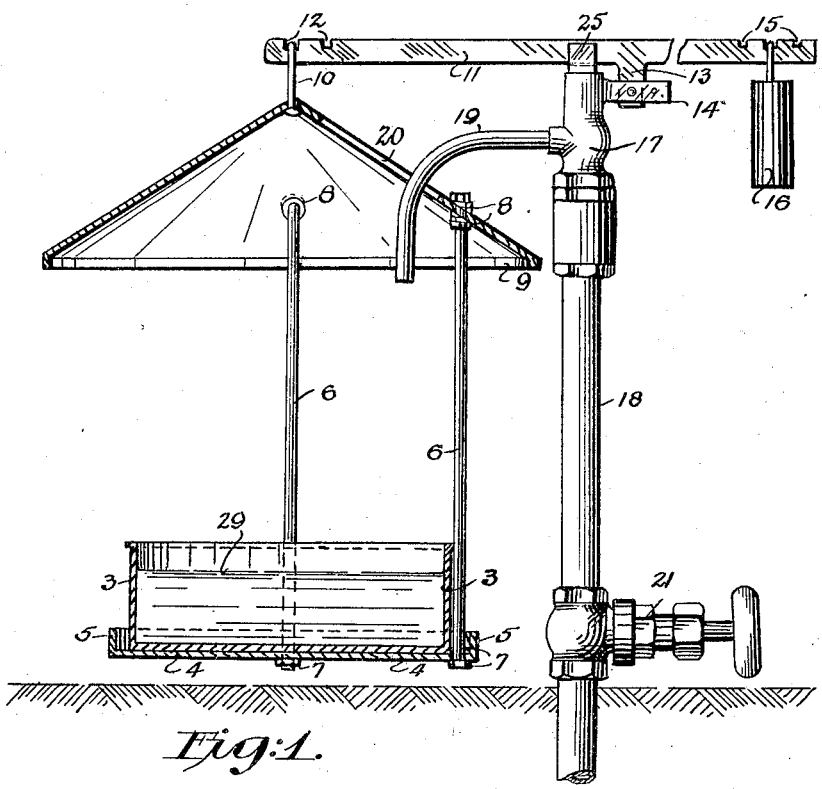
Fig:1.
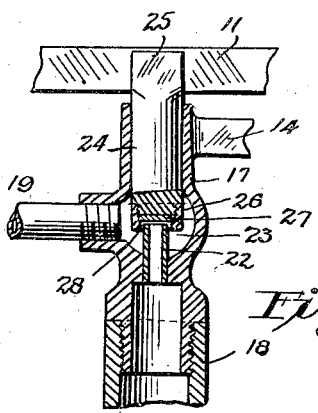
Fig:2.
Inventors
George Allman
Stanley B. Hemming
By
Attorney Patented July 29, 1930

1,771,947

UNITED STATES PATENT OFFICE

GEORGE ALLMAN AND STANLEY BAIRD HEMMING, OF PARKERVILLE, WESTERN AUSTRALIA, AUSTRALIA

AUTOMATIC ANIMAL DRINKING FOUNTAIN

Application filed May 16, 1928, Serial No. 278,117, and in Australia November 21, 1927.

The aim of this invention, as its title implies is to provide an automatic animal drinking fountain, principally for poultry, and by its use the supply of water is automatically maintained to said fountain, the weight of water in the drinking vessel later controls the water feed from the main or other source of water supply with the result that the fountain is always maintained at the predetermined level.

The construction and use of the invention will now be described with the aid of the attached drawings, wherein Fig. 1 is a part sectional elevation showing the invention as installed and ready for use. Fig. 2 is an enlarged sectional elevation of the control valve as fitted in the casing.

Referring to said drawings, the fountain comprises a freely removable vessel 3 preferably of circular dish shape and which is positioned on the tray 4 made with an upstanding flange 5 which prevents the vessel from slipping off the tray 4. This tray is suspended by upstanding bolts 6 which are secured to the tray by locknuts 7, and at their head ends secured by locknuts 8 to a circular hood 9. This hood, by central hook 10 is removably suspended to a lever 11 formed with adjustment gaps 12, said lever by its lug 13 being pivotally and adjustably held on a like lug 14 said lever 11 is also provided with adjustment gaps 15 to thereon receive a counterbalance weight 16. The lug 14 is secured to or made integral with the valve casing 17 of the water supply pipe 18. From said casing extends the curved water outlet pipe 19 which is threaded through a slot 20 formed therefor in the hood 9.

The water supply is controlled by a tap or valve 21 fitted on the pipe 18 as seen in Fig. 1.

Within the valve casing 17 is fitted a short tube 22 the upper end of which terminates within the relief cavity 23 of the casing 17 and acts as a seat for the piston or plunger 24, said piston or plunger being formed with a jaw 25 whereby it is adapted to removably receive the lever 11. This piston or plunger at its lower end is fitted with a screw cap 26 in which is held a sealing washer 27 made of rubber, leather, or analogous material, and which makes sealing contact against the upper or head end of the tube 22.

This cap is formed with an inwardly turned flange 28 whose object is to retain the sealing washer 27 in position.

The operation of the invention is as follows:—

The water, being turned on by the control valve 21, upwardly flows and by its pressure, lifts the piston valve 24 and pivoted lever 11 and thereto connected members, and flows out through the tube 22 into the relief cavity 23 formed therefor in the casing 17, and from thence through the curved outlet pipe 19 into the vessel 3.

Upon the latter being filled to the predetermined level, as indicated at 29, the increased weight causes a downward pressure on the pivoted lever 11 which is communicated to the piston valve 24, thus causing same to close and become tightly sealed on and against the mouth of the tube 22 thus temporarily shutting off the water supply until the level 29 of the water in the vessel 3 is lowered, whereupon the above mentioned operation is repeated and the water in the vessel replenished.

What we claim as our invention and desire to secure by Letters Patent is:—

1. In a drinking fountain of the type set forth, a water supply pipe, a valve casing in the head thereof, a valve working in said casing, a lug formed on said casing, a horizontal lever pivoted to said lug integrally, an adjustable counterbalance weight carried at one end of said lever, a hood adjustably carried upon the other end of the lever and provided with an opening, a tray detachably suspended from said hood at a plurality of points, a vessel for holding water removably mounted in the tray, and an outlet pipe connected to the valve casing and extending through the opening in said hood and above the vessel.

2. In a drinking fountain of the type set forth, a valve casing, a piston valve working therein, jaws integrally formed on the head of said valve, a horizontal pivoted biased lever connected to said jaws, a screw threaded cap fitted to the lower end of said piston valve, a washer having seating and sealing contact with a tube fitted within said casing and carried by the cap, an outlet pipe connected to the casing, a hood suspended from the lever and through which the pipe extends, and a drinking vessel suspended from the hood and below the outlet pipe.

In testimony whereof we have hereunto set our hands.

GEORGE ALLMAN.
STANLEY BAIRD HEMMING.